July 13, 1965 R. R. POLLOCK 3,194,712
WHITEWALL APPLYING APPARATUS
Filed Oct. 26, 1962 2 Sheets-Sheet 1

INVENTOR
RANDOLPH R. POLLOCK

BY
ATTORNEY

INVENTOR
RANDOLPH R. POLLOCK

United States Patent Office 3,194,712
Patented July 13, 1965

3,194,712
WHITEWALL APPLYING APPARATUS
Randolph R. Pollock, 1103 N. Locust Ave.,
Lawrenceburg, Tenn.
Filed Oct. 26, 1962, Ser. No. 233,296
5 Claims. (Cl. 156—394)

This invention relates to pneumatic tires and the like fluid pressure retaining devices, to the appearance and decorative trim on such devices, and to apparatus and equipment by which such trim or decorative effect may be produced or improved.

The invention relates particularly to apparatus and equipment employed in the provision of a white or decorative sidewall, upon a pneumatic tire or other device of darker character and including the attachment of a strip or ring of vulcanizable material to such a pneumatic tire or casing.

Heretofore the attachment of decorative strips or rings to provide white sidewalls to pneumatic automobile tires or casings has been laborious and time-consuming and has required the removal of the tires from the rims of the wheels of the automobiles and the use of expensive equipment such as molds, pressurized air bags, and other equipment. Efforts have been made to vulcanize a decorative strip or ring to a tire or casing with the latter mounted on the rim; however, these efforts have not been successful due primarily to difficulty of alignment between the trim and the tire.

It is an object of the invention to provide simple, practical, efficient and undesirable apparatus for aligning a decorative trim relative to a pneumatic tire while the latter is mounted on its rim and such apparatus is adapted to engage the rim in performing such an aligning operation.

Another object of the invention is to provide apparatus by which decorative trim may be adapted simultaneously to a pair of automobile tires which differ in size.

Other objects and advantages of the invention will be apparent from the following description taken in conjunction with the accompanying drawings in which.

Figure 1:
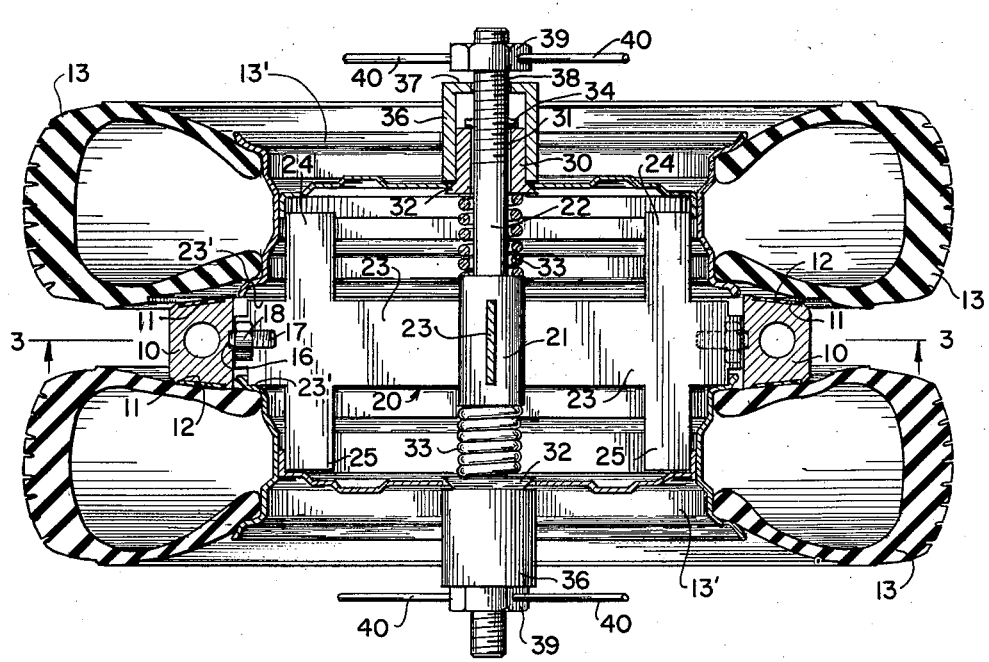
FIG. 1 is a vertical section illustrating one embodiment of the invention.
Figure 3:
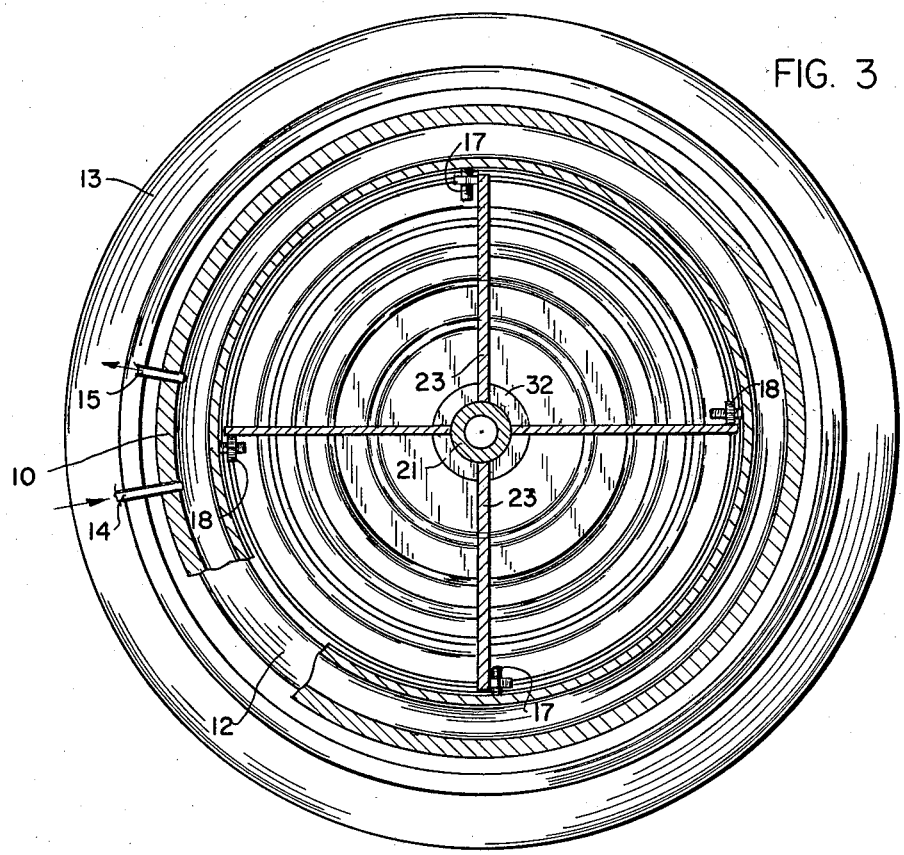

FIG. 3, a section on the line 3—3 of FIG. 1; and

Figure 4:
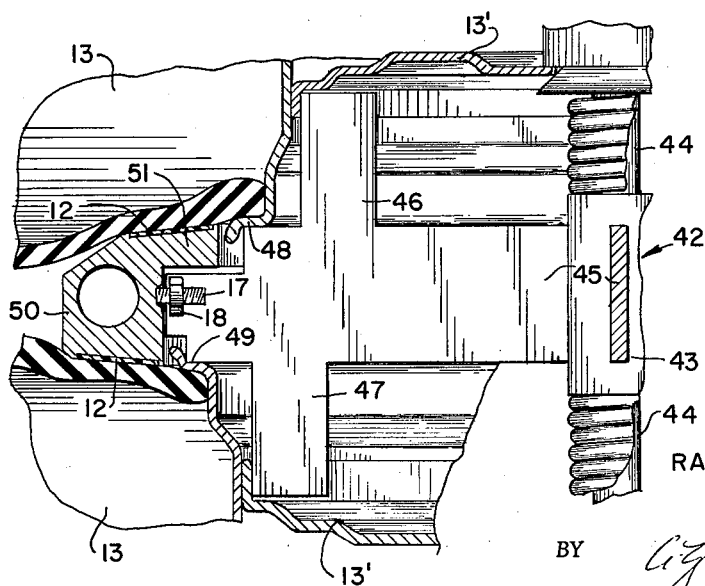

FIG. 4, an enlarged fragmentary section of a modified form of the invention.

Briefly stated, the invention comprises apparatus for vulcanizing a whitewall or decorative trim in an automobile tire, and includes a ring mold having grooves on opposite sides for the reception of decorative strips, and means is provided for supplying heat sufficient to perform the vulcanizing operation. The ring mold is mounted on a centering jig having a plurality of lugs which engage the drop center portion of the rim and a plurality of shoulders which engage the bead flange of such rim. The center portion of the jig has reduced extremities which slidably receive plugs or guides having portions projecting through the central hub opening of the rim and such guides have tapered portions for engaging the rim. A hollow sleeve is provided which telescopically receives the guide and such sleeve has a closed end with an aperture for receiving the reduced extremity of the jig. A spring is provided which normally maintains the guide in its outermost position against a stop but upon the application of a nut, the sleeve will engage the rim and will force the guide toward said jig until the rim is seated on the jig.

With continued reference to the drawings, the present invention includes apparatus and method for attaching a decorative whitewall strip or ring of rubber or the like to a tire casing. The apparatus comprises a hollow ring mold 10 having a groove 11 on opposite sides thereof for the reception of a ring of rubber 12 in each groove to be vulcanized or otherwise attached to a tire casing 13 carried on a rim 13'.

The ring mold 10 is provided with heat in the form of live steam to perform the vulcanizing process and such steam is introduced into the mold through a line 14 (FIG. 3) and the condensate is discharged therefrom through a line 15. Although the ring mold is illustrated as being heated by steam, any other heat producing means would serve the purpose.

In order to maintain the ring mold 10 in a fixed position a peripheral groove 16 is provided on the inner diameter of the mold and such groove receives a plurality of set screws 17 threadedly mounted within nuts 18 secured by weld 19 to a jig 20. The jig 20 includes a center post 21 having oppositely extending reduced threaded extremities 22 and a plurality of radially extending arms 23, four of such arms disposed 90° apart having been found satisfactory.

Each of the arms 23 has an upwardly projecting lug or extension 24 and an oppositely disposed downwardly projecting lug or extension 25. The outer free end of each of the arms 23 is provided with shoulders 23' adapted to engage the bead flanges of the rims 13' and such shoulders terminate in reduced end portions 26 to which the nuts 18 are secured. The lugs or extensions 24 and 25 are spaced from the center post 21 of the jig 20 a distance corresponding to the inner peripheral wall of the drop center portion of the rim 13' and is adapted to engage such wall when the rim is applied to the jig 20. The outer end portions of the arms 23 are adapted to engage the bead flange of the rim to limit axial movement of such rim in one direction.

In order to mount the rim 13' on the jig 20, a plug or guide 30 having an axial bore 31 is slidably mounted on each of the reduced extremities 22. Each of the guides 30 is generally cylindrical throughout most of its length and has an outwardly tapered portion 32 adjacent to one end. The cylindrical portion is of a size to pass through the central hub opening of the rim 13' and the tapered portion 32 is adapted to engage the rim at such central opening. A spring 33 is located about the reduced extremity intermediate the guide 30 and the center post 21 to normally urge such guide outwardly against a stop 34. The spring 33 is sufficiently strong to support the guide 30 and the tire and rim mounted thereon so that the tire casing does not engage the ring mold 10 or the ring of rubber 12.

A hollow sleeve 36 having a closed end 37 with an opening 38 therein is placed over the reduced portion 22 with such reduced portion extending through the opening 38. The inside diameter of the sleeve 36 is slightly greater than the cylindrical portion of the guide 30 and such gude is telescopically received within the sleeve. The open end of the sleeve 36 bears against the rim 13' and in order to force the rim downwardly so that the tire 13 is in intimate engagement with the ring of rubber 12, a nut 39 threadedly engages the reduced portions 22 and rotation of such nut will force the sleeve and guide into clamping engagement with the rim and move the sleeve, rim and guide downwardly against the tension of the spring 33. If desired, the nut 39 may have oppositely disposed lever handles 40 attached thereto for rotating such nut.

Figure 2:
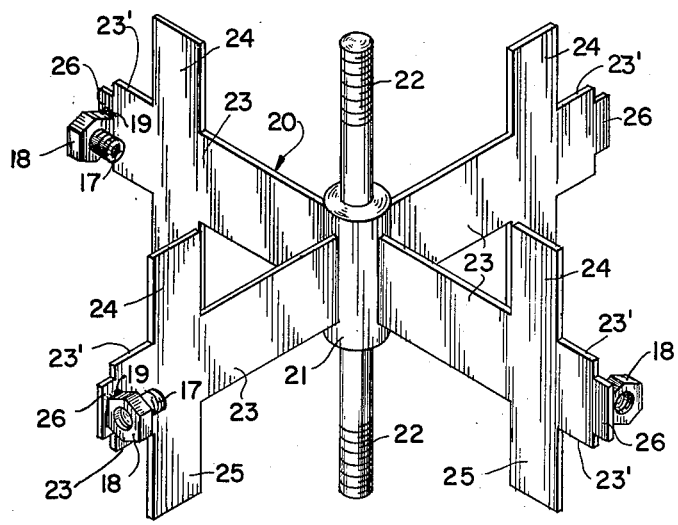
FIG. 2, is a perspective of the centering jig.

The apparatus disclosed in FIGS. 1–3 is designed for use in applying a whitewall ring 12 to either one or two tires of the same size and as illustrated in FIG. 4 an apparatus is provided for applying a whitewall ring to tires of different sizes.

In the modification of FIG. 4 a jig 42 is provided with a central portion 43 having reduced threaded extremities 44 and a plurality of radially extending arms 45 similar to the arms 23 previously described. The arms 45 have upward projecting lugs 46 and downward projecting lugs 47 with such lugs being offset from each other in a vertical plane. The outer free end of each of the arms 45 is provided with shoulders 48 and 49 which bear against the bead flanges of the rims 13'. Such shoulders are vertically offset from each other to accommodate rims of varying diameters. A nut 18 is secured to the outer end of each of the arms 45 and threadedly receives set screws 17 which support a ring mold 50 similar to the ring mold 10 except that such ring mold is provided with an offset portion 51 in such a manner that the rubber trim rings 12 are offset from each other so that they may be located in the same relative position on tires of different sizes.

In the operation of the device, a wheel and a tire to which a whitewall ring is to be vulcanized or otherwise applied are removed from an automobile and the side of the tire which normally is disposed inwardly of the automobile is buffed to provide a bonding surface. A ring of white rubber or the like is then placed within the grooves 11 and the air under pressure within the tire is expelled. The tire and the rim are then placed over the jig 20 so that the lugs 24 engage the drop center portion of the rim and the central hub opening of the rim engages the tapered portion of the guide 30 to cause the tire to be centered on the jig. The sleeve 36 is then placed about the guide 30 and in contact with the rim 13' and the nut 39 is threaded onto the free end of the reduced portion 22 until it engages the sleeve 36. Continued rotation of the nut will force the sleeve 36, guide 30 and rim 13' downwardly against the tension of the spring 33 until the bead flange of the rim engages the shoulder 23'. Air under pressure is then introduced into the tire and since the tire is bearing against the ring mold 10 the tire will be slightly deformed to eliminate any hold of pressure during the vulcanizing process. After the tire has been inflated steam is introduced into the ring mold and the vulcanized process is completed whereupon the tire and the rim are removed from the jig 20 and the tire is removed from the rim and reversed so that the whitewall will appear on the outer sidewall of the tire.

It will be apparent that the apparatus could be utilized to apply scrub shoulders or could be utilized to repair cuts and abrasions in the sidewalls of the tires as well as in the application of a sidewall.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for simultaneously vulcanizing decorative rubber trim to a plurality of pneumatic tires mounted on rims comprising a centering jig having a central portion, a plurality of arms connected at one end to said central portion and extending radially therefrom, a pair of projections extending outwardly from opposite sides of each of said arms adjacent the other ends for engaging and guiding the tire rims, a heatable mold ring having oppositely disposed mold surfaces located about said centering jig and attached to said other ends of said arms, said central portion having reduced threaded extremities extending oppositely and axially thereof, quickly disconnectable rim centering means axially slidably mounted on said reduced extremities, and force applying means for moving the tire rims into engagement with said jig and the tires onto engagement with said mold ring.

2. The structure of claim 1, in which said quickly disconnectable rim centering means includes guide means having a cylindrical portion and a tapered frusto-conical portion, said cylindrical portion extending through the central opening of the rim and said tapered portion engaging one side thereof, sleeve means telescopically receiving said cylindrical portion and engageable with the opposite side of the rim, and spring means located between said guide means and the central portion of said jig.

3. The structure of claim 1 including stop means on each of said arms for limiting the movement of the rims in one direction.

4. The structure of claim 1 in which said mold ring has mold surfaces of unequal diameters to accommodate decorative trim of varying sizes.

5. The structure of claim 1 in which said mold ring attached to the other ends of said arms is removable and replaceable by another mold ring having mold surfaces of substantially the same or different diameters.

References Cited by the Examiner
UNITED STATES PATENTS

| | | | |
|---|---|---|---|
| 2,609,039 | 9/52 | Henderson | 157—1.24 |
| 2,616,487 | 11/52 | Parks | 157—1.26 |
| 2,672,651 | 3/54 | Smyser | 18—18 |
| 2,802,512 | 8/57 | Rouse. | |
| 2,807,507 | 9/57 | Cook | 301—36 |
| 2,842,191 | 7/58 | Coats | 157—1.26 |
| 2,868,270 | 1/59 | Brown | 18—18 XR |
| 3,068,049 | 12/62 | Smith | 301—36 |
| 3,074,468 | 1/63 | Tarazona | 157—1.24 |

FOREIGN PATENTS 771,013   3/57   Great Britain.

MICHAEL V. BRINDISI, *Primary Examiner.*